US009231720B2

(12) United States Patent
Ichimura et al.

(10) Patent No.: US 9,231,720 B2
(45) Date of Patent: Jan. 5, 2016

(54) INTERFACE CIRCUIT FOR TRANSMITTING AND RECEIVING DIGITAL SIGNALS BETWEEN DEVICES

(71) Applicant: Sony Corporation, Tokyo (JP)

(72) Inventors: Gen Ichimura, Tokyo (JP); Hidekazu Kikuchi, Kanagawa (JP); Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/621,779

(22) Filed: Feb. 13, 2015

(65) Prior Publication Data

US 2015/0163001 A1 Jun. 11, 2015

(30) Foreign Application Priority Data

Nov. 22, 2007 (JP) ................................. 2007-303185

(51) Int. Cl.
| | |
|---|---|
| *H04J 3/06* | (2006.01) |
| *H04L 25/02* | (2006.01) |
| *H04L 25/493* | (2006.01) |
| *H04N 21/436* | (2011.01) |
| *H04N 21/4363* | (2011.01) |
| *H04N 21/643* | (2011.01) |
| *H04L 7/00* | (2006.01) |

(52) U.S. Cl.
CPC ............ *H04J 3/0638* (2013.01); *H04J 3/0641* (2013.01); *H04L 7/0091* (2013.01); *H04L 25/0272* (2013.01); *H04L 25/0292* (2013.01); *H04L 25/493* (2013.01); *H04N 21/43615* (2013.01); *H04N 21/43635* (2013.01); *H04N 21/64322* (2013.01)

(58) Field of Classification Search
CPC ...... H04N 5/38; H04N 5/44; H04N 21/43622; H04N 21/43635
See application file for complete search history.

(56) References Cited

U.S. PATENT DOCUMENTS

| | | | |
|---|---|---|---|
| 5,872,471 | A | 2/1999 | Ishibashi et al. |
| 5,889,820 | A | 3/1999 | Adams |

(Continued)

FOREIGN PATENT DOCUMENTS

| | | |
|---|---|---|
| JP | 2002-204272 A | 7/2002 |
| JP | 2004504733 T | 2/2004 |

(Continued)

OTHER PUBLICATIONS

International Search Report for PCT/JP2008/070693, Dec. 9, 2008, 2 pages.

(Continued)

*Primary Examiner* — Curtis A Alia

(74) *Attorney, Agent, or Firm* — Lerner, David, Littenberg, Krumholz & Mentlik, LLP

(57) ABSTRACT

A video signal and an audio signal are TMDS transmitted from a source device to a sink device. Through a reserved line and a HPD line provided separately from a TMDS transmission line, an Ethernet™ signal is bidirectionally transmitted, and also, a SPDIF signal is transmitted from the sink device to the source device. The Ethernet™ signal bidirectionally transmitted between Ethernet™ transmitter/receiver circuits is differentially transmitted by an amplifier and is received by the amplifier. The SPDIF signal from a SPDIF transmitter circuit is common-mode transmitted from an adder and is received by the adder to be supplied to the SPDIF receiver circuit.

7 Claims, 13 Drawing Sheets

(56) References Cited

U.S. PATENT DOCUMENTS

| | | |
|---|---|---|
| 6,307,543 B1 | 10/2001 | Martin |
| 6,492,984 B2 | 12/2002 | Martin |
| 6,813,483 B1 | 11/2004 | Lynch et al. |
| 6,940,973 B1 | 9/2005 | Yeap et al. |
| 7,042,254 B2 | 5/2006 | Hori |
| 7,292,637 B2 | 11/2007 | Ho et al. |
| 7,397,283 B2 | 7/2008 | Chiu et al. |
| 7,773,107 B2 | 8/2010 | Kwon et al. |
| 7,991,096 B1 | 8/2011 | Kim et al. |
| 2002/0003873 A1 | 1/2002 | Rabenko et al. |
| 2002/0044147 A1 | 4/2002 | Martin |
| 2004/0239374 A1 | 12/2004 | Hori |
| 2004/0258183 A1 | 12/2004 | Popescu et al. |
| 2005/0015480 A1 | 1/2005 | Foran |
| 2005/0135489 A1 | 6/2005 | Ho et al. |
| 2005/0182876 A1 | 8/2005 | Kim et al. |
| 2005/0259948 A1* | 11/2005 | Ando ............................ 386/46 |
| 2007/0143801 A1 | 6/2007 | Madonna et al. |
| 2007/0230909 A1 | 10/2007 | Mukaide et al. |
| 2007/0283071 A1 | 12/2007 | Konishi |
| 2007/0290712 A1 | 12/2007 | Gomez et al. |
| 2007/0297520 A1 | 12/2007 | Ho et al. |
| 2008/0111921 A1 | 5/2008 | Tung et al. |
| 2008/0133249 A1 | 6/2008 | Hashiguchi et al. |
| 2008/0155635 A1 | 6/2008 | Johnson et al. |
| 2008/0158405 A1 | 7/2008 | Matsumoto |
| 2008/0212582 A1 | 9/2008 | Zwart et al. |
| 2009/0052208 A1 | 2/2009 | Li |
| 2009/0116583 A1 | 5/2009 | Lida et al. |
| 2009/0237561 A1 | 9/2009 | Kobayashi |

FOREIGN PATENT DOCUMENTS

| | | |
|---|---|---|
| JP | 2004-356714 A | 12/2004 |
| JP | 2007515140 T | 6/2007 |
| JP | 2007-267116 A | 10/2007 |
| JP | 2007-297520 A | 11/2007 |
| WO | 00/16306 A1 | 3/2000 |
| WO | 01/41443 A1 | 6/2001 |
| WO | 2008/056686 A1 | 5/2008 |

OTHER PUBLICATIONS

Written Opinion for PCT/JP2008/070693.
International Preliminary Report on Patentability for PCT/JP2008/070693.
"SPDIF," Wikipedia, All pages.
Office Action from U.S. Appl. No. 12/844,447 mailed May 12, 2011.
Office Action from U.S. Appl. No. 12/451,270 mailed Mar. 3, 2011.
Office Action from U.S. Appl. No. 12/771,126 mailed Mar. 1, 2011.
Office Action from U.S. Appl. No. 12/844,425 mailed Mar. 3, 2011.
Office Action from Japanese Application No. 2007-303185, Feb. 17, 2009.
US Office Action for U.S. Appl. No. 13/600,858, dated Feb. 24, 2015.

* cited by examiner

FIG.2
PRIOR ART

| PIN NUMBER | SIGNAL NAME |
| --- | --- |
| 1 | TMDS DATA 2 POSITIVE |
| 2 | TMDS DATA 2 SHIELD |
| 3 | TMDS DATA 2 NEGATIVE |
| 4 | TMDS DATA 1 POSITIVE |
| 5 | TMDS DATA 1 SHIELD |
| 6 | TMDS DATA 1 NEGATIVE |
| 7 | TMDS DATA 0 POSITIVE |
| 8 | TMDS DATA 0 SHIELD |
| 9 | TMDS DATA 0 NEGATIVE |
| 10 | TMDS CLOCK POSITIVE |
| 11 | TMDS CLOCK SHIELD |
| 12 | TMDS CLOCK NEGATIVE |
| 13 | CEC |
| 14 | RESERVED |
| 15 | SCL (DDC SERIAL CLOCK) |
| 16 | SDA (DDC SERIAL DATA) |
| 17 | DDC/CEC GROUND |
| 18 | POWER (+5V) |
| 19 | HPD (HOT PLUG DETECT) |

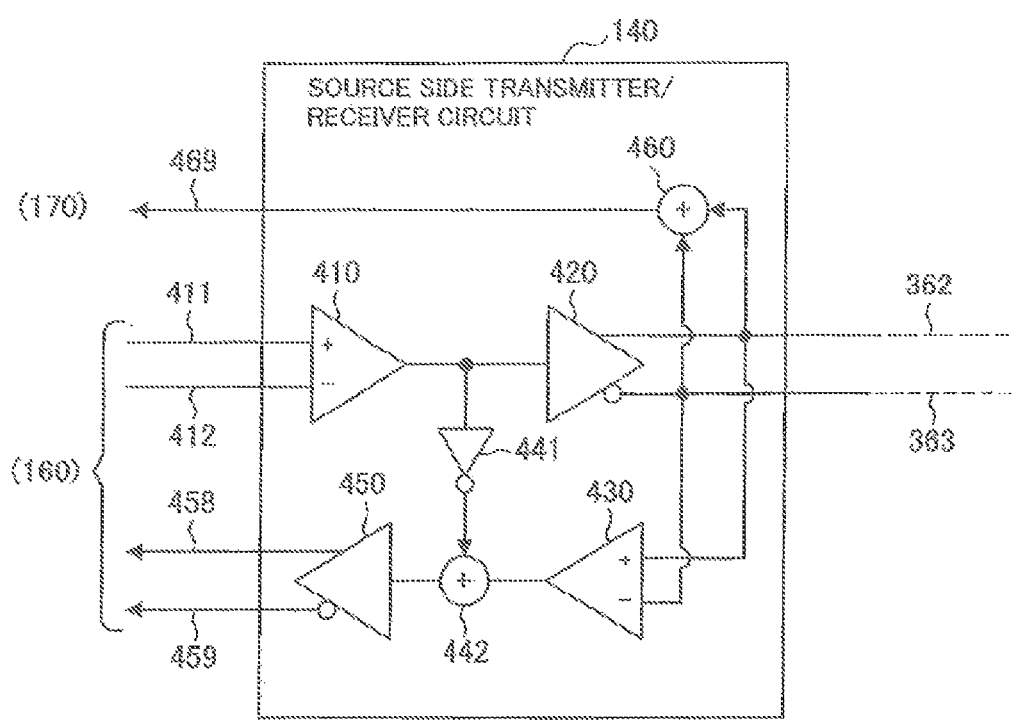

FIG.5

| MODE | PIN 14 | PIN 19 |
|---|---|---|
| (HDMI) | RESERVED | HPD |
| ETHERNET | RESERVED + ETHERNET | HPD − ETHERNET |
| SPDIF | RESERVED + SPDIF | HPD + SPDIF |
| ETHERNET + SPDIF | RESERVED + ETHERNET + SPDIF | HPD − ETHERNET + SPDIF |

FIG.11
PRIOR ART

| PREAMBLE | CHANNEL CODING | | |
|---|---|---|---|
| "B" | 11101000 | 00010111 | SUBFRAME #1, BLOCK START |
| "M" | 11100010 | 00011101 | SUBFRAME #1 |
| "W" | 11100100 | 00011011 | SUBFRAME #2 |
| | 0 | 1 | |
| | IMMEDIATELY PRECEDING STATE | | |

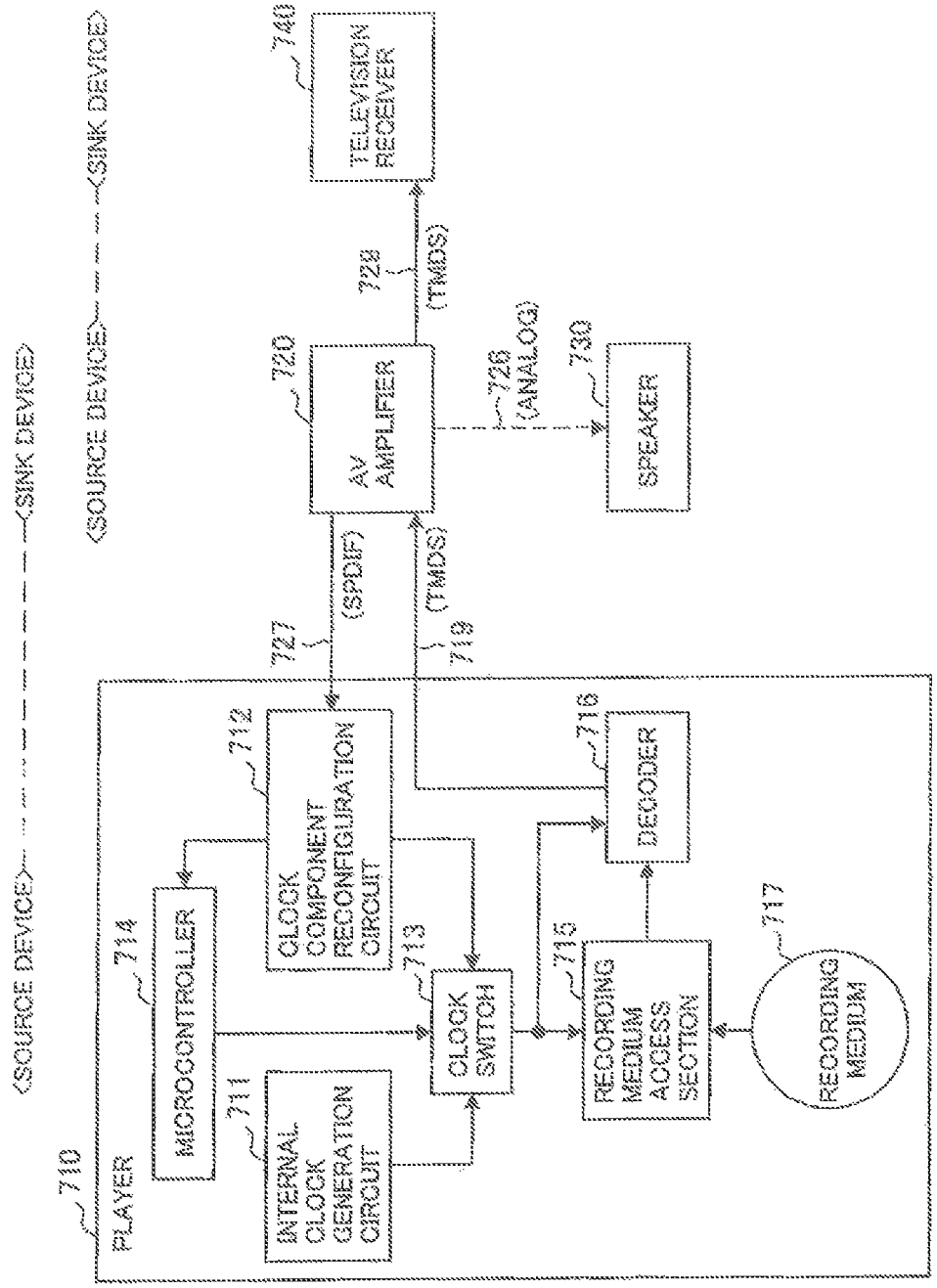

INTERFACE CIRCUIT FOR TRANSMITTING AND RECEIVING DIGITAL SIGNALS BETWEEN DEVICES

CROSS-REFERENCE TO RELATED APPLICATIONS

This application is a divisional of U.S. patent application Ser. No. 14/098,783, filed on Dec. 6, 2013, which is a continuation of U.S. patent application Ser. No. 13/569,461, filed on Aug. 8, 2012 (U.S. Pat. No. 8,639,841) which is a continuation of U.S. patent application Ser. No. 12/844,425, filed on Jul. 27, 2010 (U.S. Pat. No. 3,260,955), which is a continuation of U.S. patent application Ser. No. 12/451,270, filed on Nov. 3, 2009, which is a national phase entry under 35 U.S.C. §371 of International Application No. PCT/JP2008/070693, filed Nov. 13, 2008, which claims priority to Japanese Patent Application No. JP2007-303185, filed on Nov. 22, 2007, all of the disclosures of which are incorporated herein by reference. This application is also related to U.S. patent application Ser. No. 12/771,126, filed on Apr. 30, 2010, the disclosure of which is incorporated herein by reference.

BACKGROUND OF THE INVENTION

1. Field of the Invention

The present invention relates to an interface circuit, and more particularly, to an interface circuit for transmitting digital signals, such as audio signals and video signals, between devices.

2. Description of Related Art

In recent years, as audio/visual (AV) devices using digital signals, such as audio signals or video signals, become widespread, various types of interfaces have been proposed as interfaces for transmitting digital signals between these AV devices. For example, as such interfaces, the Institute of Electrical and Electronics Engineers (IEEE) 1394 standards, the High-Definition Multimedia Interface (HDMI) standards HDMI is a registered trademark), and the (HDMI) standards (HDMI is a registered trademark), and the like, are widely known (for example, see JP-A-2007-267116 (FIG. 1)).

Furthermore, for a comparatively large-scale system, an interface for distributing digital signals by using Ethernet™ has also been proposed (for example, see JP-T-2003-523653 (FIGS. 6A and 6B)).

SUMMARY OF THE INVENTION

When Ethernet™ is used for a connection between AV devices, since a bidirectional communication according to Internet Protocol (IP) is performed, there arises a problem that software processing takes time, thus, lacking in real-time characteristics. To overcome the problem, synchronization needs to be performed between the AV devices, therefore requiring a large buffer for adjusting the speed. Furthermore, a process of sending a time stamp from a transmitter side and regenerating a clock, which is a reference, at a receiver side is needed, which may result in a jitter (unstable clock) and signal delay.

The present invention has been achieved in view of the situation, and has its object to supply the real-time characteristics of an Ethernet™ signal differentially transmitted.

The present invention has been achieved to solve the above-described problem, and its first aspect is an interface circuit including a first transmitting section for transmitting a first signal as a differential signal to an external device through a transmission line, and a second transmitting section for transmitting a second signal, being multiplexed to the transmission line, as a common-mode signal to the external device. Thereby, an effect that the differentially transmitted first signal and the common-mode transmitted second signal are multiplexed with each other and transmitted through a same transmission line is achieved.

Furthermore, according to the first aspect, the second signal may be a signal including a clock component. Thereby, an effect that the clock component is transmitted to the external device is achieved. Here, as an example, the second signal may include a biphase-mark modulated signal.

Furthermore, the first aspect may further include a receiving section for receiving a third signal by removing the first signal from the differential signal on the transmission line. Thereby, an effect that the differential signals are transmitted bidirectionally is achieved. Here, as an example, the first transmitting section and the receiving section can perform a bidirectional communication according to Internet Protocol (IP). Furthermore, the transmission line can use a reserved line and a hot-plug detect line forming an HDMI cable.

Furthermore, the second aspect of the present invention is an interface circuit including a first receiving section for extracting a first signal from a differential signal received from an external device through a transmission line, and a second receiving section for extracting a second signal from a common-mode signal received from the external device through the transmission line. Thereby, an effect that the differentially transmitted first signal and the common-mode transmitted second signal are received through a same transmission line is achieved.

Furthermore, according to the second aspect, the second signal may be a signal including a clock component. Thereby, an effect that the clock component is received from the external device is achieved. Here, as an example, the second signal may include a biphase-mark modulated signal.

Furthermore, the second aspect may further include a transmitting section for transmitting a third signal as a differential signal to the external device through the transmission line, wherein the first receiving section may extract the first signal by removing the third signal from the differential signal on the transmission line. Thereby, an effect that the differential signals are bidirectionally transmitted is achieved. Here, as an example, the first receiving section and the transmitting section can perform a bidirectional communication according to Internet Protocol (IP). Furthermore, the transmission line can use a reserved line and a hot-plug detect line forming an HDMI cable.

The present invention has been achieved to solve the above-described problem, and its first aspect is an interface circuit including a first transmitting section for transmitting a first signal as a differential signal to an external device through a transmission line, and a second transmitting section for transmitting a second signal, being multiplexed to the transmission line, as a common-mode signal to the external device. Thereby, an effect that the differentially transmitted first signal and the common-mode transmitted second signal are multiplexed with each other and transmitted through a same transmission line is achieved.

Furthermore, according to the first aspect, the second signal may be a signal including a clock component. Thereby, an effect that the clock component is transmitted to the external device is achieved. Here, as an example, the second signal may include a biphase-mark modulated signal.

Furthermore, the first aspect may further include a receiving section for receiving a third signal by removing the first signal from the differential signal on the transmission line. Thereby, an effect that the differential signals are transmitted bidirectionally is achieved. Here, as an example, the first transmitting section and the receiving section can perform a bidirectional communication according to internet Protocol (IP). Furthermore, the transmission line can use a reserved line and a hot-plug detect line forming an HDMI cable.

Furthermore, the second aspect of the present invention is an interface circuit including a first receiving section for extracting a first signal from a differential signal received from an external device through a transmission line, and a second receiving section for extracting a second signal from a common-mode signal received from the external device through the transmission line. Thereby, an effect that the differentially transmitted first signal and the common-mode transmitted second signal are received through a same transmission line is achieved.

Furthermore, according to the second aspect, the second signal may be a signal including a clock component. Thereby, an effect that the clock component is received from the external device is achieved. Here, as an example, the second signal may include a biphase-mark modulated signal.

Furthermore, the second aspect may further include a transmitting section for transmitting a third signal as a differential signal to the external device through the transmission line, wherein the first receiving section may extract the first signal by removing the third signal from the differential signal on the transmission line. Thereby, an effect that the differential signals are bidirectionally transmitted is achieved. Here, as an example, the first receiving section and the transmitting section can perform a bidirectional communication according to Internet Protocol (IP). Furthermore, the transmission line can use a reserved line and a hot-plug detect line forming an HDMI cable.

Effect of the Invention

According to the present invention, a prominent effect of being able to supply the real-time characteristics of an Ethernet™ signal that is differentially transmitted can be achieved.

In one embodiment, an interface circuit is provided. The interface circuit comprises first receiving means for extracting a first signal from a differential signal received from an external device through a transmission line and second receiving means for extracting a second signal from a common-mode signal received from the external device through the transmission line. The interface circuit also comprises a communication unit for communicating with the external device via a pair of differential transmission lines included in the transmission line. The communication unit receives a notification on a connection status from the external device by at least one of direct current bias potentials of the pair of differential transmission lines.

In one example, the second signal is a signal including a clock component. Here, the second signal desirably includes a biphase-mark modulated signal.

In another example, the interface circuit further comprises transmitting means for transmitting a third signal as a differential signal to the external device through the transmission line. Here, the first receiving means extracts the first signal by removing the third signal from the differential signal on the transmission line.

In one alternative, the first receiving means and the transmitting section perform a bidirectional communication according to Internet Protocol (IP). In another alternative, the transmission line is a reserved line and a hot-plug detect line forming an HDMI cable. And in a further example, the second signal is a SPDIF signal.

BRIEF DESCRIPTION OF THE DRAWINGS

FIG. 2 is a diagram showing an example of a pin arrangement of a connector according to HDMI standards;

FIG. 4B is a diagram showing an example of a configuration of the source side transmitter/receiver circuit 140 and the sink side transceiver/receiver circuit 250 according to the embodiment of the present invention;

FIG. 5 is a diagram showing a schematic view of an operation of the embodiment of the present invention;

FIG. 11 is a diagram showing channel coding for a preamble according to SPDIF standards; and FIG. 12 is a diagram showing an example of a system configuration according to the embodiment of the present invention.

DETAILED DESCRIPTION

Figure 1:
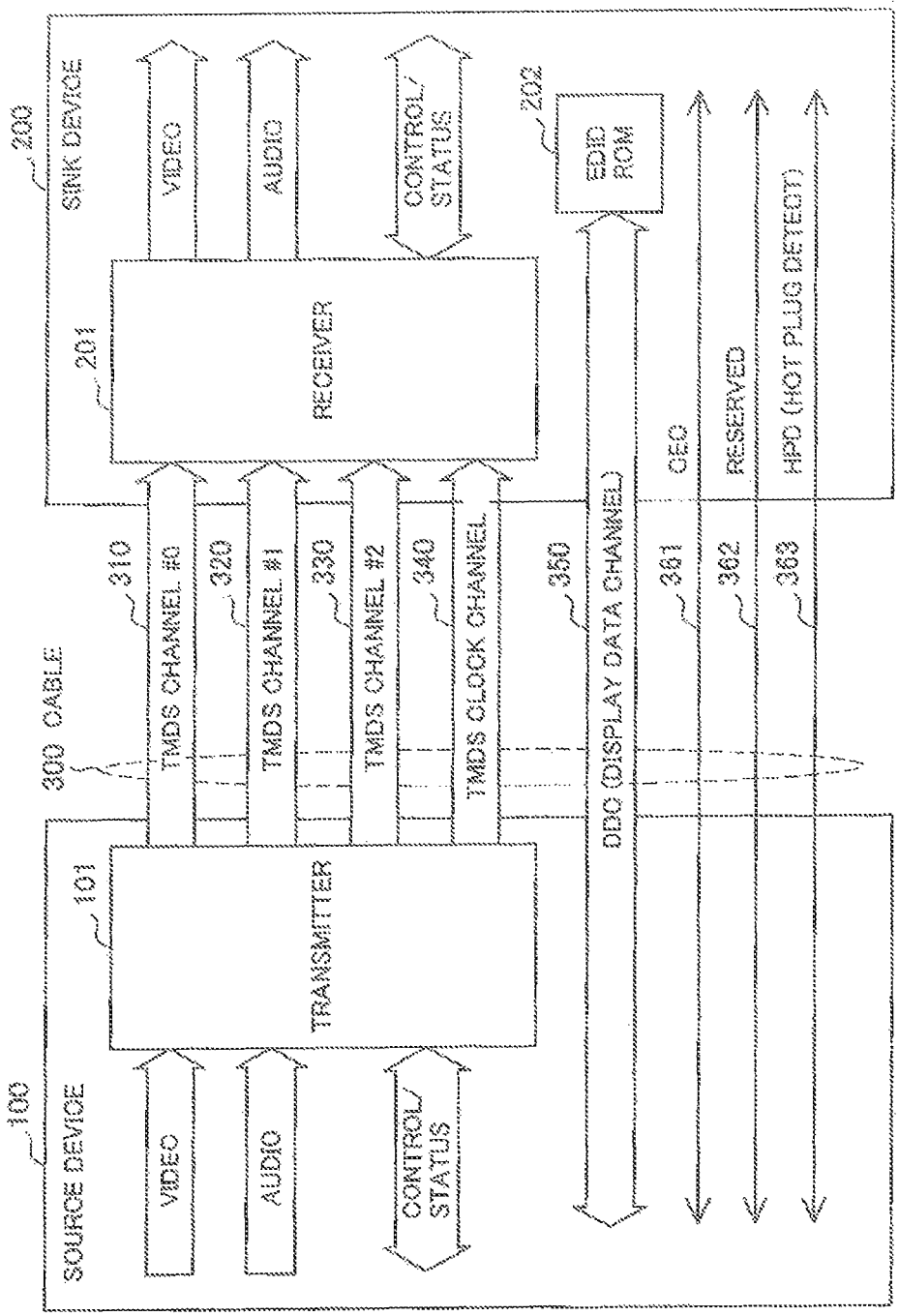
FIG. 1 is a schematic diagram of an interface according to HDMI standards.

Hereinafter, preferred embodiments of the present invention will be explained in detail with reference to the appended drawings. Note that, in this specification and the appended drawings, structural elements that have substantially the same function and structure are denoted with the same reference numerals, and repeated explanation of these structural elements is omitted.

Here, assuming an example for an interface according to HDMI standards where an Ethernet™ signal that is differentially transmitted is added, an explanation will be given on an embodiment for supplying the real-time characteristics of an Ethernet™ signal.

FIG. 1 is a schematic diagram of the interface according to HDMI standards. With respect to HDMI standards, a basic transmission direction of a high-speed transmission line is set to be unidirectional, and a device on the transmitter side is referred to as a source device (example of a transmitting section) and a device on the receiver side is referred to as a sink device (example of a receiving section). In this example, a source device 100 and a sink device 200 are connected by an HDMI cable 300. A transmitter 101 for performing a transmission operation is included in the source device 100, and a receiver 201 for performing a receiving operation is included in the sink device 200.

A serial transmission system called Transition Minimized Differential Signaling (TMDS) is used for the transmission between the transmitter 101 and the receiver 201. With respect to HDMI standards, video signals and audio signals are transmitted by using three TMDS channels 310 to 330. Specifically, during an effective image period, which is a period excluding a horizontal blanking period and a vertical blanking period from a period between a vertical synchronizing signal and the next vertical synchronizing signal, a differential signal corresponding to the pixel data of an image for one uncompressed screen is transmitted unidirectionally towards the sink device 200 through the TMDS channels 310 to 330. Furthermore, during the horizontal blanking period or the vertical blanking period, a differential signal corresponding to audio data, control data, other auxiliary data, or the like, is transmitted unidirectionally towards the sink device 200 through the TMDS channels 310 to 330.

Furthermore, with respect to HDMI standards, a clock signal is transmitted through a TMDS clock channel 340. Each of the TMDS channels 31C to 330 can transmit 10 bits of pixel data during transmission of one clock through the TMDS channel 340.

Furthermore, with respect to HDMI standards, a display data channel (DDC) 350 is provided. The display data channel 350 is employed by the source device to read Enhanced Extended Display Identification Data (E-EDID) information in the sink device 200. The E-EDID information indicates, where the sink device 200 is a display device, information relating to the setting or performance such as the type, resolution, color characteristics, or timing. The E-EDID information is held in an EDID ROM 202 of the sink device 200. Note that, although not shown, like the sink device 200, the source device 100 can also store the E-EDID information and transmit the E-EDID information to the sink device 200 when necessary.

In addition, with respect to HDMI standards, a consumer electronics control (CEC) line 361, a reserved line 352, a hot plug detect (HPD) line 363, and the like, are provided. The CEC line 361 is a line for a bidirectional communication of device control signals. Whereas the display data channel 330 connects devices in a one-to-one manner, the CEC line directly connects all devices connected to HDMI.

The reserved line 362 is a line not utilized in HDMI standards. Furthermore, the HPD line 363 is a line for detecting the connection (hot plug) to another device by the HDMI cable. The embodiment of the present invention assumes that an Ethernet™ signal is transmitted by using the reserved line 362 and the HPD line 353, and further, proposes a mechanism of supplying the real-time characteristics of the Ethernet™ signal.

FIG. 2 is a diagram showing a pin arrangement of a connector according to HDMI standards. In such cases, the corresponding relationship between a pin number 301 and a signal name 302 according to a pin arrangement called Type A is shown.

Each of the TMDS channels 310 to 330 and the TMDS clock channel 340 is configured by three pins: positive, shield, and negative. Pins 1 to 3 correspond to the TMDS channel 330, Pins 4 to 6 correspond to the TMDS channel 320, Pins 7 to 9 correspond to the TMDS channel 310, and Pins 10 to 12 correspond to the TMDS clock channel 340, respectively.

In addition, Pin 13 corresponds to the CEC line 361, Pin 14 corresponds to the reserved line 362, and Pin 19 corresponds to the HPD line 303, respectively. Furthermore, the display data channel 350 is configured by three pins, namely serial clock (SCL), serial data (SDA), and a ground, to which Pins 15 to 17 respectively correspond. Note that the ground (Pin 17) for the display data channel 350 is the same as that for the CEC line 361. Pin 18 corresponds to a power supply line (+5V).

Figure 3:
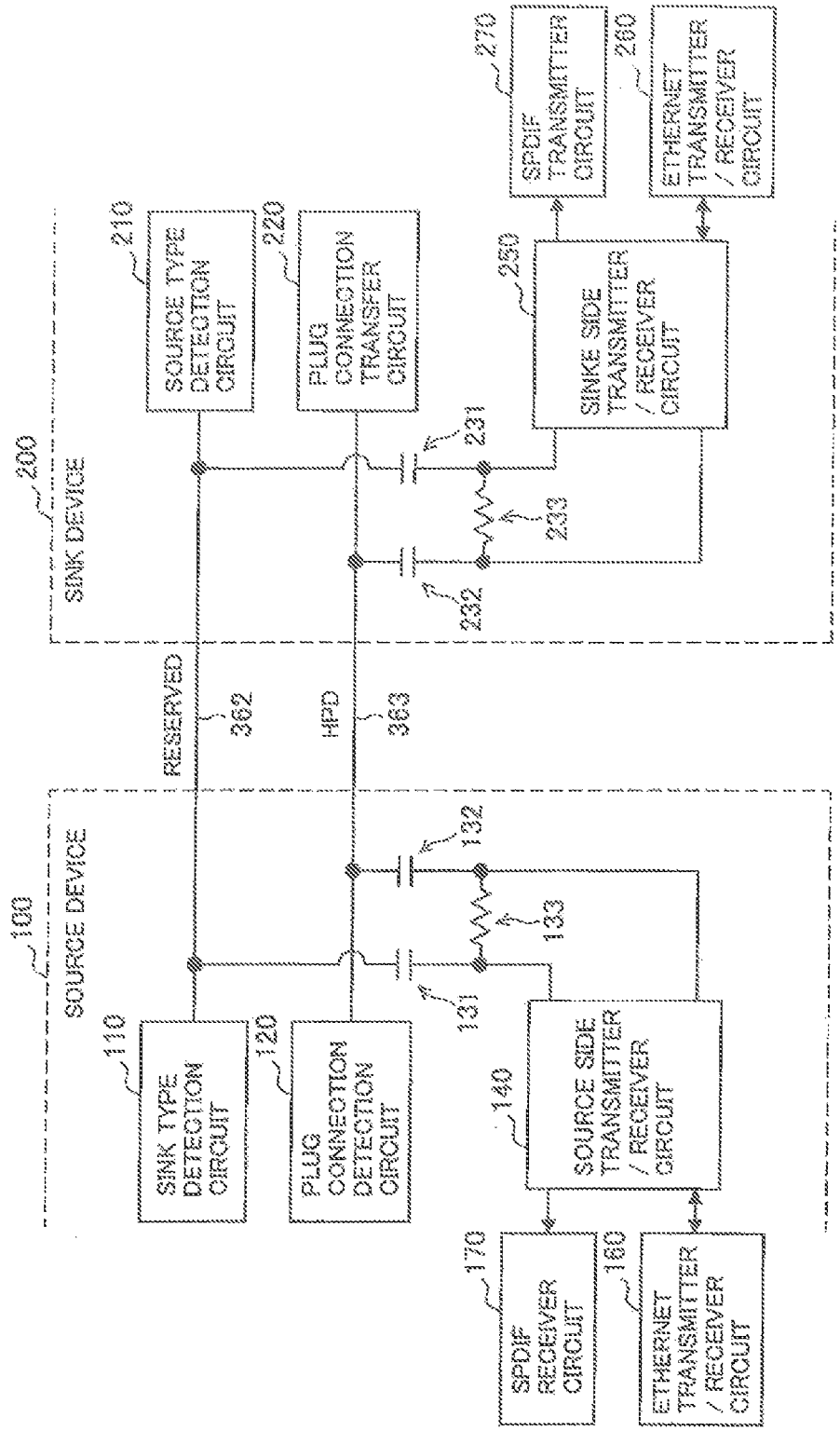
FIG. 3 is a diagram showing an example of an internal configuration of a source device 100 and a sink device 200 according to an embodiment of the present invention.

FIG. 3 is a diagram showing an example of an internal configuration of the source device 100 and the sink device 200 according to the embodiment of the present invention. In such cases, configurations of the reserved line 362 and the HPD line 363, which are the main parts in the embodiment of the present invention, are shown. The source device 100 includes a sink type detection circuit 110, a plug connection detection circuit 120, a source side transmitter/receiver circuit 140, a Sony/Philips digital interface (SPDIF) receiver circuit 170, and an Ethernet™ transmitter/receiver circuit 160. Furthermore, the sink device 200 includes a source type detection circuit 210, a plug connection transfer circuit 220, a sink side transmitter/receiver circuit 250, a SPDIF transmitter circuit 270, and an Ethernet™ transmitter/receiver circuit 260.

As described above, the reserved line 362 is, a line not utilized in HDMI standards. However, in the present case, the reserved line 362 is being used to detect the type of a device that is connected for the sake of efficient use of a pin. Specifically, the sink type detection circuit 110 of the source device 100 detects the type of the sink device 20 via the reserved line 362. Furthermore, the source type detection circuit 210 of the sink device 200 detects the type of the source device 100 via the reserved line 362. The type here can be assumed to be of a type which extends HDMI standards to enable a bidirectional transmission of the Ethernet™ signal through the reserved line 362 and the HPD line 363 (hereinafter, referred to as an "HDMI extension type").

As described above, the HPD line 363 is a line for detecting connection to another device by the HDMI cable. The plug connection transfer circuit 220 of the sink device 200 notifies that the sink device 200 is connected by biasing a terminal connected to the HPD line 363 to a predetermined voltage. The plug connection detection circuit 120 of the source device 100 detects the connection of the sink device 200 by comparing the electric potential of the terminal connected to the HPD line 363 with a reference potential.

In the embodiment of the present invention, the source side transmitter/receiver circuit 140 and the sink side transmitter/receiver circuit 250 are connected to the reserved line 362 and the HPD line 363 having such functions. That is, the source side transmitter/receiver circuit 140 of the source device 100 connects to the reserved line 363 and the HPD line 303 via condensers 131 and 132 and a resistor 133. Also, the sink side transmitter/receiver circuit 250 of the sink device 200 connects to the reserved line 362 and the HPD line 363 via condensers 231 and 232 and a resistor 233.

The source side transmitter/receiver circuit 140 connects the Ethernet™ signal that is bidirectionally transmitted by using the reserved line 362 and the HPD line 363 to the Ethernet™ transmitter/receiver circuit 160 and connects a SPDIF signal that is transmitted to the source device 100 by using the reserved line 302 and the HPD line 363 to the SPDIF receiver circuit 170.

The sink side transmitter/receiver circuit 250 connects the Ethernet™ signal that is bidirectionally transmitted by using the reserved line 362 and the HPD line 363 to the Ethernet™ transmitter/receiver circuit 260 and connects a SPDIF signal that is transmitted from the source device 100 by using the reserved line 362 and the HPD line 303 to the SPDIF transmitter circuit 270.

The Ethernet™ transmitter/receiver circuits 160 and 260 are circuits for transmitting/receiving the Ethernet™ signal, and perform a bidirectional communication according to Internet Protocol (IP), for example. In the present case, the Transmission Control Protocol (TCP) or the User Datagram Protocol (UDP) can be used as the upper layer of Internet protocol (IP). These Ethernet™ transmitter/receiver circuits 100 and 260 can be realized by a conventional technology.

The SPDIF receiver circuit 170 and the SPDIF transmitter circuit 270 perform a unidirectional communication according to SPDIF. Here, SPDIF standards are interface standards for transmitting a digital audio signal in real time, and which are standardized by the International Electrotechnical Commission (IEC) as "IEC 60958". As described later, the SPDIF signal to be transmitted according to SPDIF standards is biphase-mark modulated, and thus, includes a clock component in the signal. Incidentally, the SPDIF receiver circuit 170 and SPDIF transmitter circuit 270 are realized by a conventional technology.

Figure 4A:
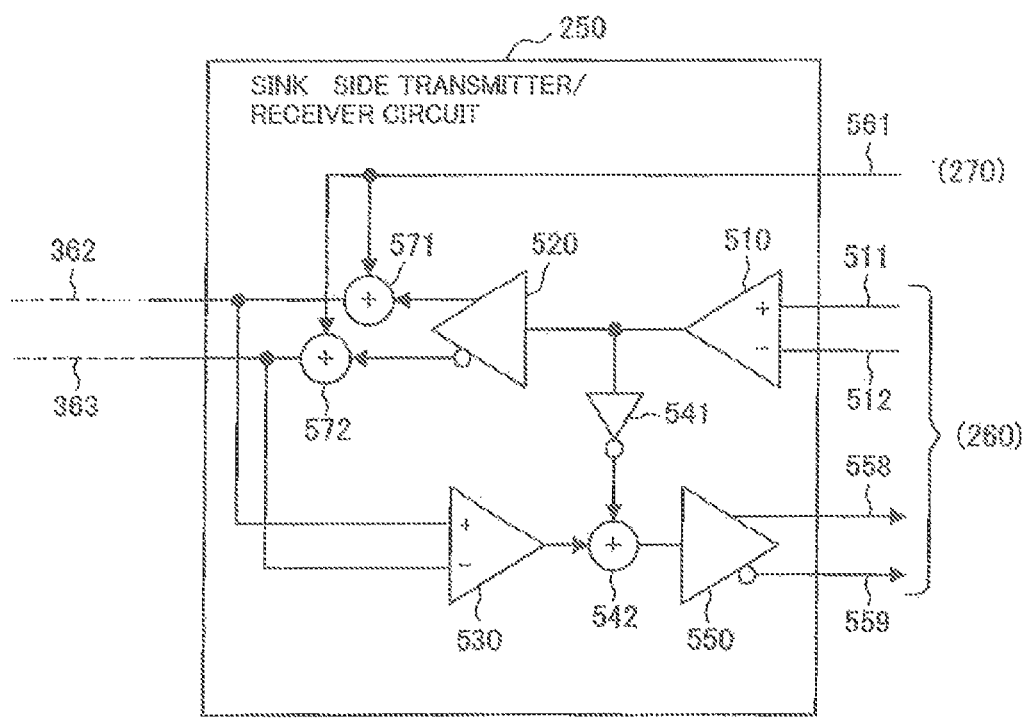
FIG. 4A is a diagram showing an example of a configuration of a source side transmitter/receiver circuit 140 and a sink side transmitter/receiver circuit 250 according to the embodiment of the present invention.

FIGS. 4A and 4B are diagrams showing examples of a configuration of the source side transmitter/receiver circuit 140 and the sink side transmitter/receiver circuit 250 according to the embodiment of the present invention.

As shown in FIG. 4A, the sink side transmitter/receiver circuit 250 includes amplifiers 510, 520, 530 and 550, an inverter 541, and adders 542, 571 and 572.

The amplifier 510 is an amplifier for amplifying signals supplied from the Ethernet™ transmitter/receiver circuit 260 through signal lines 511 and 512. The signals of the signal lines 511 and 512 are differential signals, and the amplifier 510 operates by a differential input.

The amplifier 520 is an amplifier for amplifying the output of the amplifier 510. The outputs of the amplifier 520 are differential signals, and the signal of the positive electrode is supplied to the adder 571 and the signal of the negative electrode is supplied to the adder 572, respectively.

The amplifier 530 is an amplifier for amplifying the signals from the reserved line 362 and the HPD line 363. The signals of the reserved line 362 and the HPD line 363 are differential signals, and the amplifier 530 operates by a differential input.

The inverter 541 is a circuit for inverting the output of the amplifier 510. The adder 542 is a circuit for adding the output of the inverter 541 and the output of the amplifier 530. That is, the inverter 541 and the adder 542 input to the amplifier 550 a signal from the reserved line 362 and the HPD line 363 with an output signal of the sink device 200 removed therefrom.

The amplifier 550 is an amplifier for amplifying the output of the adder 542. The outputs of the amplifier 550 are differential signals, and the signal of the positive electrode is supplied to a signal line 558 and the signal of the negative electrode is supplied to a signal line 559, respectively. The Ethernet™ transmitter/receiver circuit 260 is connected to the signal lines 558 and 559, and a signal which is a signal from the reserved line 362 and the HPD line 363 with the output signal of the sink device 200 removed therefrom is supplied to the Ethernet™ transmitter/receiver circuit 260.

The adder 571 is a circuit for adding the signal supplied from the SPDIF transmitter circuit 270 through a signal line 561 and the positive electrode output of the amplifier 520. The adder 572 is, the adder 571 is a circuit for adding the signal supplied from the SPDIF transmitter circuit 270 through the signal line 561 and the negative electrode output of the amplifier 520.

That is, whereas the Ethernet™ signal outputted from the amplifier 550 is a differential signal, the SPDIF signal multiplexed by the adders 571 and 572 is a common-mode signal. Thus, both of the Ethernet™ signal and the SPDIF signal can be transmitted through the same pair of signal lines (reserved line 362 and HPD line 363).

As shown in FIG. 4B, the source side transmitter/receiver circuit 140 includes amplifiers 410, 420, 430 and 450, an inverter 441, and adders 442 and 460.

The amplifier 410 is an amplifier for amplifying-signals supplied from the Ethernet™ transmitter/receiver circuit 160 through signal lines 411 and 412. The signals of the signal lines 411 and 412 are differential signals, and the amplifier 410 operates by a differential input.

The amplifier 420 is an amplifier for amplifying the outputs of the amplifier 410. The outputs of the amplifier 420 are differential signal, and the signal of the positive electrode is supplied to the reserved line 362 and the signal of the negative electrode is supplied to the HPD line 363, respectively.

The amplifier 430 is an amplifier for amplifying the signals from the reserved line 362 and the HPD line 363. The signals of the reserved line 362 and the HPD line 363 are differential signals, and the amplifier 430 operates by a differential input.

The amplifier 450 is an amplifier for amplifying the output of the adder 442. The outputs of the amplifier 450 are differential signals, and the signal of the positive electrode is supplied to a signal line 458 and the signal of the negative electrode is supplied to a signal line 459, respectively. The Ethernet™ transmitter/receiver circuit 160 is connected to the signal lines 458 and 459, and a signal which is a signal from the reserved line 362 and the HPD line 363 with the output signal of the source device 100 removed therefrom is supplied to the Ethernet™ transmitter/receiver circuit 160.

The inverter 441 is a circuit for inverting the output of the amplifier 410. The adder 442 is a circuit for adding the output of the inverter 441 and the output of the amplifier 430. That is, the inverter 441 and the adder 442 input to the amplifier 450 a signal which is a signal from the reserved line 362 and the HPD line 363 with the output signal of the source device 100 removed therefrom.

The adder 460 is a circuit for adding the signal of the positive electrode and the signal of the negative electrode, which are outputs of the amplifier 420.

That is, of the signals transmitted by the reserved line 352 and the HPD line 363, the differential signal is extracted by the amplifier 430 as the Ethernet™ signal, and the common-mode signal is extracted by the adder 400 as the SPDIF signal.

FIG. 5 is a diagram showing a schematic view of an operation in the embodiment of the present invention. The embodiment of the present invention assumes a case where the Ethernet™ signal is transmitted as a differential signal by using the reserved line 362 and the HPD line 363, and further, a SPDIF signal is transmitted as a common-mode signal by using the same line to supply the real-time characteristics of the Ethernet™ signal.

The operation according to the embodiment of the present invention is summarized in FIG. 5. As described above, Pin 14 corresponds to the reserved line 362, and Pin 19 corresponds to the HPD line 363. When neither the Ethernet™ signal nor the SPDIF signal is transmitted, the operation is conducted in accordance with conventional HDMI standards. When transmitting the Ethernet™ signal, the positive electrode signal of the Ethernet™ signal is multiplexed to Pin 14, and the negative electrode signal of the Ethernet™ signal is multiplexed to Pin 19. Also, when transmitting the SPDIF signal, the positive electrode signal of the SPDIF signal is multiplexed to Pin 14 and Pin 19. Furthermore, when transmitting both the Ethernet™ signal and the SPDIF signal, the positive electrode signal of the Ethernet™ signal and the positive electrode signal of the SPDIF signal are multiplexed to Pin 14, and the negative electrode signal of the Ethernet™ signal and the positive electrode signal of the SPDIF signal are multiplexed to Pin 10.

Accordingly, the Ethernet™ signal and the SPDIF signal can be independently transmitted on the reserved line 362 and the HPD line 363, and the receiver side (source side transmitter/receiver circuit 140) requires no particular mechanism regardless of whether both signals are being transmitted or only one signal is being transmitted.

Figure 6A:
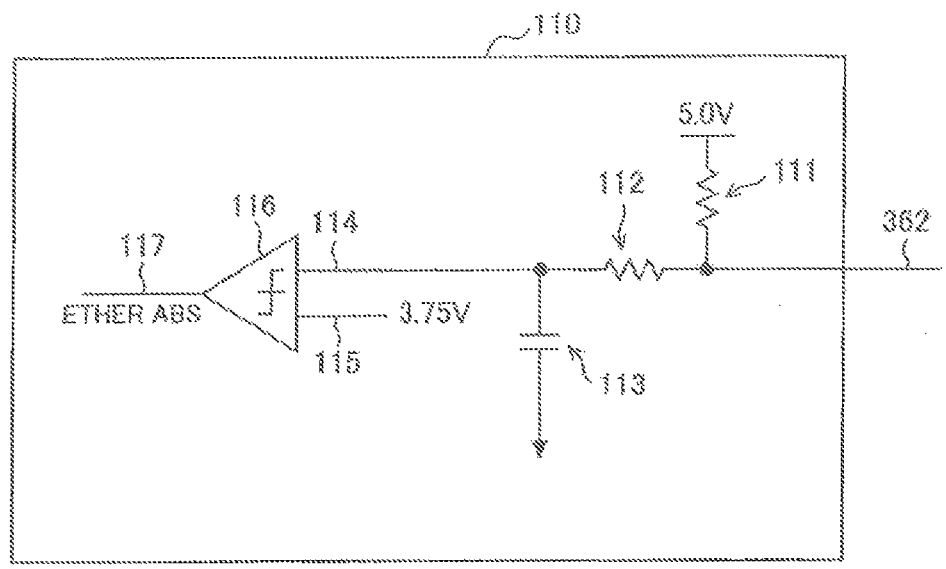
FIG. 6A is a diagram showing an example a configuration of a sink type detection circuit 110 and a source type detection circuit 210 according to the embodiment of the present invention.
Figure 6B:
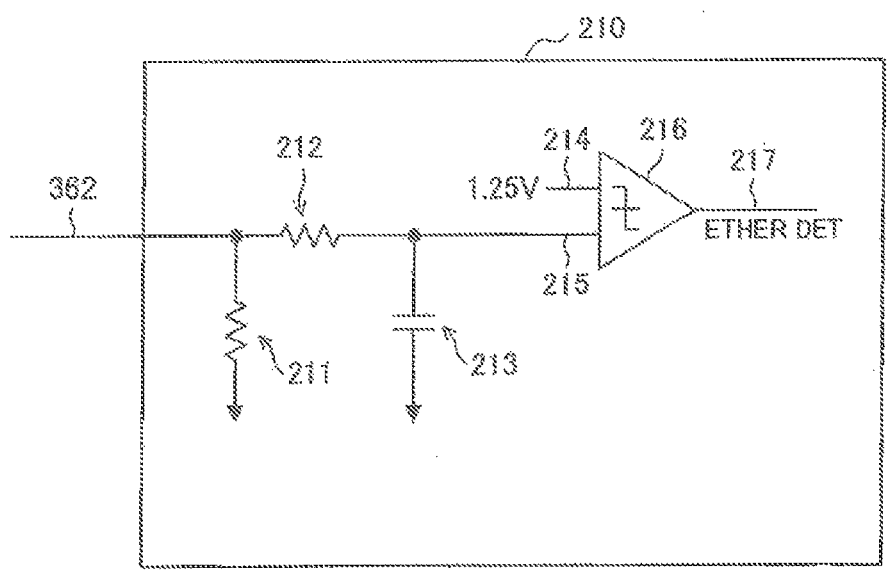
FIG. 6B is a diagram showing an example of a configuration of the sink type detection circuit 110 and the source type detection circuit 210 according to the embodiment of the present invention.

FIGS. 6A and 6B are diagrams showing configuration examples of the sink type detection circuit 110 and the source type detection circuit 210 according to the embodiment of the present invention.

As shown in FIG. 6A, the sink type detection circuit 110 includes resistors 111 and 112, a condenser 113, and a comparator 116. The resistor 111 pulls the reserved line 362 up to +5V. This resistor 111 is included only when the source device 100 is of a specific type (HDMI extended type, for example), and when the source device 100 is not of a specific type, the pull-up is not performed. The resistor 112 and the condenser 113 form a low-pass filter. The output of the low-pass filter is supplied to a signal line 114. The comparator 116 compares a DC potential supplied to the signal line 114 from the low-pass filter with a reference potential provided to a signal line 115.

Also, as shown in FIG. 6B, the source type detection circuit 210 includes resistors 211 and 212, a condenser 213, and a comparator 216. The resistor 211 pulls the reserved line 362 down to the ground potential. The resistor 211 is included only when the sink device 200 is of a specific type, and when the sink device 200 is not of a specific type, the pull-down is not performed. The resistor 212 and the condenser 213 form a low-pass filter. The output of the low-pass filter is supplied to a signal line 215. The comparator 216 compares a DC potential supplied to the signal line 215 from the low-pass filter with a reference potential provided to a signal line 214.

When the sink device 200 is of a specific type, pull-down is performed by the resistor 211 and the potential of the reserved line 352 becomes 2.5V, and when the sink device 200 is not of a specific type, the potential is released and becomes 5V. Accordingly, when the reference potential of the signal line 115 is 3.75V, for example, the type of the sink device 200 can be identified in the source device 100 based on the output of a signal line 117.

Similarly, when the source device 100 is of a specific type, pull-up is performed by the resistor 111 and the potential of the reserved line 362 becomes 2.5V, and when the source device 100 is not of a specific type, the potential becomes 0V. Accordingly, when the reference potential of the signal line 214 is, for example, 1.25V, the type of the source device 100 can be identified in the sink device 200 based on the output of a signal line 217.

Signals for the type detections are transferred at a DC bias potential, and thus, do not affect the Ethernet™ signal or the SPDIF signal that is transferred as an AC signal.

Figure 7A:
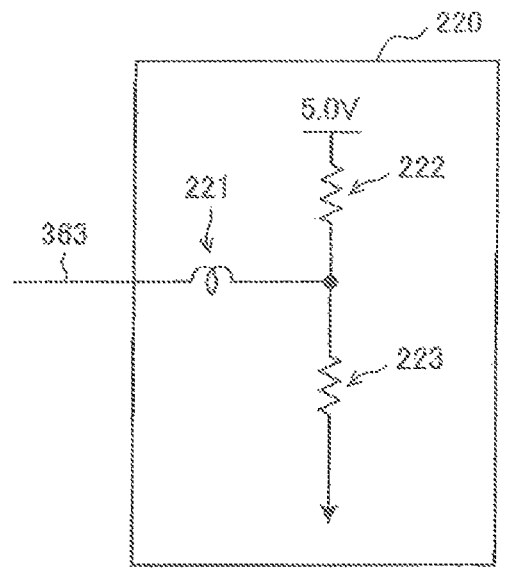
FIG. 7A is a diagram showing an example of a configuration of a plug connection detection circuit 120 and a plug connection transfer circuit 220 according to the embodiment of the present invention.
Figure 7B:
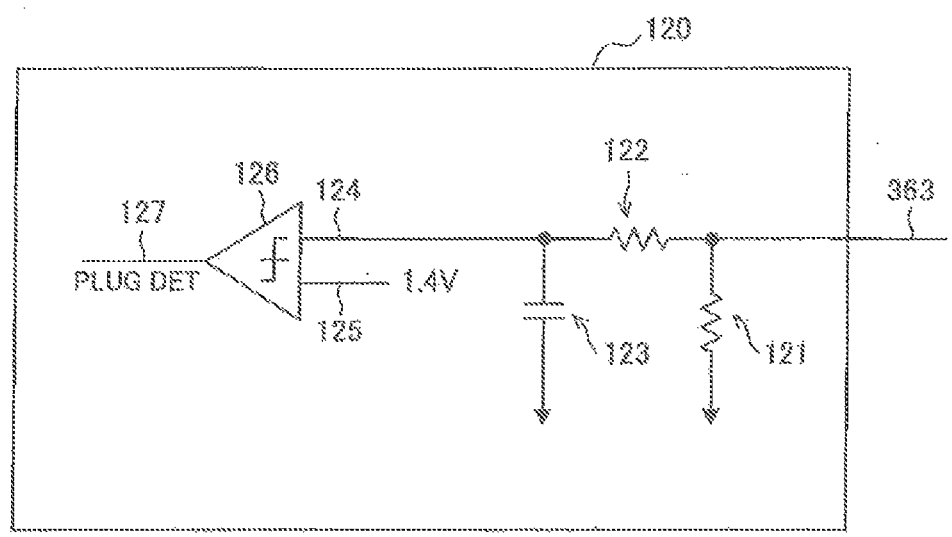
FIG. 7B is a diagram showing an example of a configuration of the plug connection detection circuit 120 and the plug connection transfer circuit 220 according to the embodiment of the present invention.

FIGS. 7A and 7B are diagrams showing configuration examples of the plug connection detection circuit 120 and the plug connection transfer circuit 220 according to the embodiment of the present invention.

As shown in FIG. 7A, the plug connection transfer circuit 220 includes a choke coil 221; and resistors 222 and 223. The choke coil 221 and the resistors 222 and 223 bias the HPD line 363 to about 4V, for example.

Also, as shown in FIG. 7B, the plug connection detection circuit 120 includes resistors 121 and 122; a condenser 123; and a comparator 126. The resistor 121 pulls the HPD line 363 down to the ground potential. The resistor 122 and the condenser 123 form a low-pass filter. The output of the low-pass filter is supplied to a signal line 124. The comparator 126 compares a DC potential supplied to the signal line 124 from the low-pass filter with a reference potential provided to a signal line 125.

Here, 1.4V, for example, is provided as the reference potential for the signal line 125. If the source device 100 is not connected to the HPD line 363, due to the input potential being pulled down by the resistor 121, the potential of the signal line 124 becomes lower than the reference potential of the signal line 125. On the other hand, if the source device 100 is connected to the HPD line 363, since the HPD line is biased to about 4V, the potential of the signal line 124 becomes higher than the reference potential of the signal line 125. Accordingly, the presence or absence of connection of the sink device 200 can be detected in the source device 100 based on the output of a signal line 127.

Signals for the plug connection detections are transferred at a DC bias potential, and thus, do not affect the Ethernet™ signal or the SPDIF signal that is transferred as an AC signal.

Next, SPDIF standards will be described with reference to the drawings.

Figure 8:
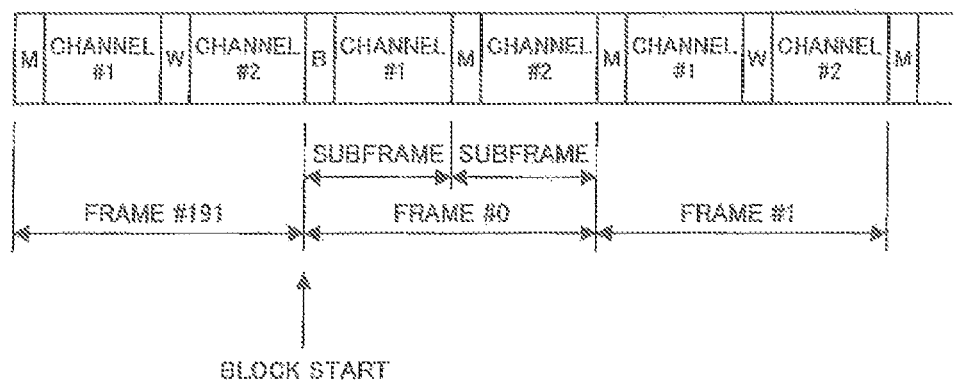
FIG. 8 is a diagram showing a frame configuration according to SPDIF standards.

FIG. 8 is a diagram showing a frame configuration according to SPDIF standards. According to SPDIF standards, each frame is configured from two subframes. In a case of 2-channel stereo audio, a left channel signal is included in the first subframe, and a right channel signal is included in the second subframe.

As described below, a preamble is provided at the beginning of the subframe, and "M" is added to the left channel signal as the preamble and "W" is added to the right channel signal as the preamble. Note that "B" indicating the start of a block is added to the preamble at the beginning for every 152 frames. That is, one block is configured from 192 frames. The block is a unit configuring a channel status described later.

Figure 9:
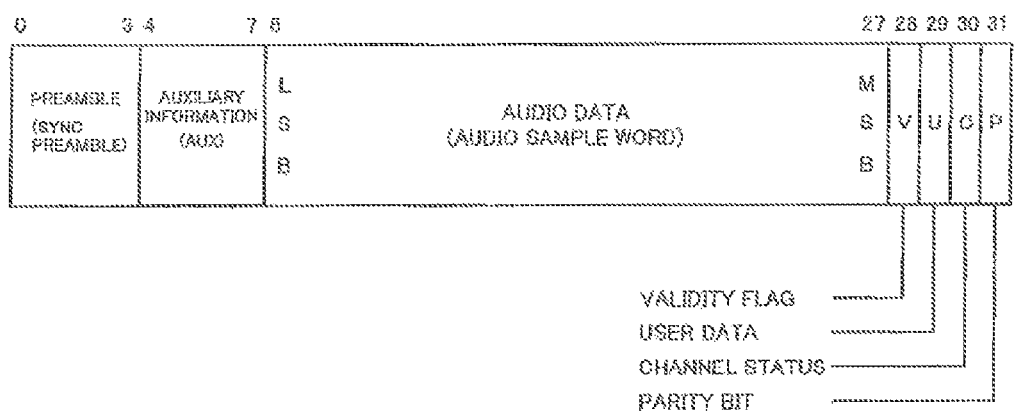
FIG. 9 is a diagram showing a subframe configuration according to SPDIF standards.

FIG. 9 is a diagram showing a subframe configuration according to SPDIF standards. The subframe is configured from 32 time slots in total, i.e., from 0th to 31st.

Time slots 0 to 3 represent the preamble (Sync preamble). As described above, the preamble indicates any of "M", "W" and "B", in order to distinguish between the left or right channels, or to indicate the starting position of the block.

Time slots 4 to 27 are a main data field, and when a 24-bit code range is adopted, the entire main data field represents audio data. Also, when a 20-bit code range is adopted, time slots 8 to 27 represent the audio data (Audio sample word). In the case of the latter, time slots 4 to 7 can be used as auxiliary information (Auxiliary sample bits).

Time slot 23 is a validity flag in the main data field.

Time slot 29 represents one bit of user data. A series of data can be configured by accumulating time slots 29 over respective frames. A user data message is configured with an 8-bit information unit (IU) as a unit, and 3 to 129 information units are included in one message, "0" of 0 to 8 bits can be present between the information units. The beginning of the information unit is identified by a start bit "1". The first seven information units in the message are reserved, and a user can set arbitrary information in the eighth or later information unit. The messages are divided from each other by "0" of eight or more bits.

Time slot 30 represents one bit of the channel status. A series of channel status can be configured by accumulating time slots 30 of respective blocks over respective frames. Incidentally, the starting position of a block is indicated by the preamble (time slots 0 to 3) as described above.

Time slot 31 is a parity bit. The parity bit is added so that the number of "0"s and "1"s included in time slots 4 to 31 is even.

Figure 10:
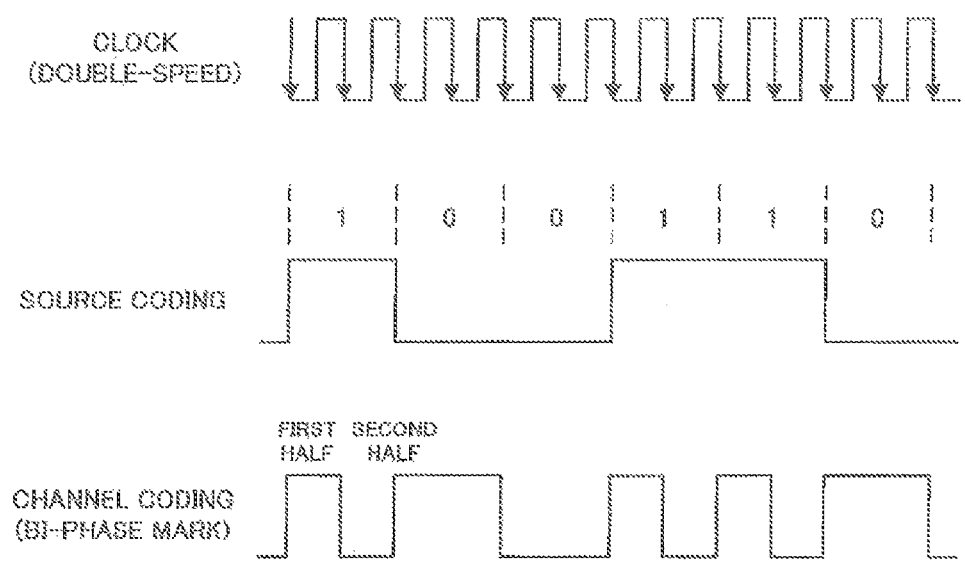
FIG. 10 is a diagram showing a signal modulation scheme according to SPDIF standards.

FIG. 10 is a diagram showing a signal modulation scheme according to SPDIF standards. According to SPDIF standards, time slots 4 to 31, which are a sub-frame from which the preamble is excluded, are biphase-mark modulated.

At the time of the biphase-mark modulation, a clock whose speed is double that of the original signal (source coding) is used. Dividing the clock cycle of the original signal into a first half and a second half, the output of the biphase-mark modulation is invariably inverted at the edge of the first half of the clock cycle. Also, when the original signal indicates "1" at the edge of the second half of the clock cycle, the output is inverted, and when the original signal indicates "0" at the edge of the second half of the clock cycle, the output is not inverted. Thereby, a clock component of the original signal can be extracted from the biphase-mark modulated signal.

FIG. 11 is a diagram showing channel coding for the preamble according to SPDIF standards. As described above, time slots 4 to 31 in the subframe are biphase-mark modulated. On the other hand, the preamble, specifically, time slots 0 to 3, is not biphase-mark modulated in the usual manner, but is handled as a bit pattern synchronized with the double-speed clock. That is, by assigning two bits to each of time slots 0 to 3, 8-bit pattern as shown in FIG. 11 is obtained.

If the immediately preceding state is "0", "11101000" is assigned to preamble "B", "11100010" is assigned to "M", and "1100100" is assigned to "W", respectively. On the other hand, if the immediately preceding state is "00010111" is assigned to preamble "B", "00011101" is assigned to "M", and "00011011" is assigned to "W", respectively.

As described above, according to the embodiment of the present invention, the SPDIF signal can be transmitted, being multiplexed to and in common mode to the Ethernet™ signal differentially transmitted through the reserved line 362 and the HPD line 363. Since the SPDIF signal includes the clock component, the sink device can extract the clock component from the SPDIP signal itself and use the same. If the sink device is an audio device, the extracted clock component can be utilized and used for audio reproduction. When an error occurs in the transmission line, the real-time characteristics can be ensured by muting that part and reproducing from subsequent data.

The Ethernet™ signal is a packetized signal, and when an error occurs in the transmission line, the signal is automatically retransmitted by a mechanism such as the Transmission Control Protocol (TCP), and thus, a highly reliable transmission is achieved. It should be noted that, in a case where real-time characteristics such as those required for an audio signal transmission are necessary, the audio reproduction is stopped during the retransmission. Also, in a normal case, the signal processing is performed by software, and thus, when compared with SPDIF in which hardware performs the processing, the delay (latency) increases. Also, a time stamp according to the Moving Picture Experts Group (MPEG)-Transport Stream (TS) or the Real-time Transport Protocol is used to regenerate an audio clock, and, in many cases, processes such as these can also be achieved by software.

By using the Ethernet™ signal and the SPDIF signal having different characteristics in combination as described above, a real-time audio transmission and a reliable packet information transmission can be achieved at the same time. In the following, an application example to which the present invention is applied will be described.

FIG. 12 is a diagram showing a system configuration example according to the embodiment of the present invention. Here, an AV system is assumed to include a player 710, an AV amplifier 720, a speaker 730, and a television receiver 740.

The player 710 and the AV amplifier 720 are HDMI-connected to each other, and where the player 710 is the source device, the AV amplifier 720 is the sink device. That is, a signal line 719 performs a unidirectional TMDS transmission from the player 710 to the AV amplifier 720. The AV amplifier 720 and the television receiver 740 are HDMI-connected to each other in a similar manner, and where the AV amplifier 720 is the source device, the television receiver 740 is the sink device. That is, a signal line 720 performs a unidirectional TMDS transmission from the AV amplifier 720 to the television receiver 740. The signal lines 710 and 729 performing the TMDS transmission correspond to the TMDS channels 310 to 330 in FIG. 1.

Also, the AV amplifier 720 and the speaker 730 are analog-connected to each other, and an audio signal reproduced by the AV amplifier 720 is output to the speaker 730 via a signal line 726.

The player 710 includes an internal clock generation circuit 711, a clock component reconfiguration circuit 712, a clock switch 713, a microcontroller 714, a recording medium access section 715, and a decoder 716.

The Internal clock generation circuit 711 is a circuit for generating a clock signal inside the player 710. The internal clock generation circuit 711 generates a clock signal by using oscillation amplitude voltage from an oscillator such as a crystal oscillator (crystal).

The clock component reconfiguration circuit 712 is a circuit for reconfiguring a clock component based on the SPDIF signal supplied from the AV amplifier 720 through a signal line 727. The signal line 727 corresponds to the reserved line 362 and the HPD line 363 in FIG. 3.

The clock switch 713 is a circuit for switching a clock to be outputted by selecting any of the clock generated in the internal clock generation circuit 711 and the clock reconfigured in the clock component reconfiguration circuit 712.

The microcontroller 714 is a microcontroller for controlling the operation of the player 710. Upon detecting the reconfiguration of the clock component in the clock component reconfiguration circuit 712, the microcontroller 714 instructs the clock switch 713 to select a clock from the clock component reconfiguration circuit 712.

The recording medium access section 715 is a circuit for reading out, according to a clock outputted from the clock switch 713, a video signal and an audio signal from a recording medium 717.

The decoder 716 decodes, according to a clock outputted from the clock switch 713, the video signal and the audio signal read out by the recording medium access section 715. The signal decoded by the decoder 716 is TMDS-transmitted to the AV amplifier 720 through the signal line 719.

The AV amplifier 720 receives a signal transmitted from the player 710 through the signal line 719, and amplifies the audio signal of the received signal and outputs the sound to the speaker 730 through the signal line 726. Also, the AV amplifier 720 transmits the video signal of the received signal to the television receiver 740 through the signal line 729.

The Ethernet™ signal is differentially transmitted through the reserved line 362 and the HPD line 363 respectively corresponding to the signal line 727, and the SPDIF signal is multiplexed in common-mode to the reserved line 362 and the HPD line 363. Accordingly, with the player 710, which is the receiver of the SPDIF signal, by taking the sum or respective signals of the reserved line 362 and the HPD line 363, the Ethernet™ signal that is differentially transmitted is removed and the SPDIF signal is obtained. The SPDIF signal includes a clock component generated inside the AV amplifier 720. Since the SPDIF signal is transmitted, being bi-phase mark modulated, even if the signal is a mute signal, for example, the clock component is transmitted from the AV amplifier 720 to the player 710. That is, the SPDIF signal according to this example needs not include an effective audio signal.

According to the application example, a clock signal generated in the AV amplifier 720 is be transmitted to the player 710, and the video signal and the audio signal can be transmitted from the player 710 to the AV amplifier 720 according to the transmitted clock signal. Accordingly, the player 710 can operate with the clock of the AV amplifier 720 as the master clock, and a so-called jitterless reproduction can be realized. Thereby, a buffer to be used for speed adjustment can be omitted from the AV amplifier 720. Also, when focusing on the accuracy of the clock generated in each device, generally, the clock of an AV amplifier is often more accurate than that of a player. Accordingly, by the player 710 operating with the clock of the AV amplifier 720 as the master clock, the reproduction quality of the audio signal can be improved.

As described above, by transmitting the SPDIF signal, the frequency synchronization of the transmitter side and the receiver side, which is difficult with only the Ethernet™ signal, can be performed easily, thus benefiting an application, which is for reproduction of a video signal or an audio signal, that requires real-time characteristics. Incidentally, in the above-described application example, an example of jitterless reproduction has been described. By using user data or channel status in the SPDIF signal, information from the sink device can be transmitted in real-time. For example, by including in the user data a reproduction frame of the video signal, reproduction time of the audio signal, or the like, of the AV amplifier 720 and transmitting the same to the player 710, the player 710 and the AV amplifier 720 can be accurately synchronized.

Heretofore, the preferred embodiments of the present invention have been explained with reference to the appended drawings. However, it is needles to say that the present invention is not limited to such examples. It is obvious that various modifications and alterations may be achieved by those skilled in the art within the scope of the claims, and it is understood that they are naturally within the scope of the claims.

Incidentally, the embodiment of the present invention is an example for realization of the present invention, and there is a correspondence relation to each of the subject matters of the claims as described below. However, the present invention is not limited to these, and various modifications can be achieved so long as not departing from the scope of the invention.

That is, in claim 1, a first transmitting section corresponds to the amplifier 520, for example. Furthermore, a second transmitting section corresponds to the adders 571 and 572, for example.

Furthermore, in claim 4, a receiving section corresponds to the amplifier 530, the inverter 541 and the adder 542, for example.

Furthermore, in claims 6 and 12, a reserved line corresponds to the reserved line 362, for example. Furthermore, a hot plug detect line corresponds the HPD line 363, for example.

Furthermore, in claim 7, a first receiving section corresponds to the amplifier 430, the inverter 441 and the adder 442, for example. Furthermore, a second receiving section corresponds to the adder 460, for example.

Furthermore, in claim 10, a transmitting section corresponds to the amplifier 420, for example.

Incidentally, the procedure described in the embodiment of the present invention may be assumed to be a method Including the series of procedures, or may be assumed to be a program for causing a computer to execute the series of procedures and a recording medium storing the program.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An output device, comprising:
a processing device configured to:
transmit a first signal as a differential signal to a first external device through a first transmission line;
transmit a second signal, being multiplexed to the first transmission line, as a common-mode signal to the first external device;
communicate with the first external device via a pair of differential transmission lines included in the first transmission line, wherein the processing device notifies the first external device of a connection status of its own device by at least one of direct current bias potentials of the pair of differential transmission lines; and
receive an audio signal from the first external device through a second transmission line; and
an analog terminal for outputting the audio signal to a second external device, wherein the audio signal is output based on selection of one of an internal clock signal of the output device and a clock component reconfigured based on an incoming signal.

2. The output device of claim 1, wherein the second signal includes the clock component.

3. The output device of claim 2, wherein the second signal includes a biphase-mark modulated signal.

4. The output device of claim 1, wherein the second signal is a SPDIF signal.

5. The output device of claim 1, wherein the processing device is configured to receive a third signal by removing the first signal from the differential signal on the second transmission line.

6. The output device of claim 5, wherein the processing device performs a bidirectional communication according to Internet Protocol (IP).

7. The output device of claim 5, wherein the second transmission line is a reserved line and a hot-plug detect line forming an HDMI cable.

* * * * *

UNITED STATES PATENT AND TRADEMARK OFFICE
CERTIFICATE OF CORRECTION

Page 1 of 1

PATENT NO. : 9,231,720 B2
APPLICATION NO. : 14/621779
DATED : January 5, 2016
INVENTOR(S) : Gen Ichimura, Hidekazu Kikuchi and Yasuhisa Nakajima It is certified that error appears in the above-identified patent and that said Letters Patent is hereby corrected as shown below:

Title page

Insert -- Related U.S. Application Data
(63) This application is a DIV of 14/098,783 12/06/2013 which is a CON of 13/569,461 08/08/2012 PAT 8639841 which is a CON of 12/844,425 07/27/2010 PAT 8260955 which is a CON of 12/451,270 11/03/2009 which is a 371 of PCT/JP2008/070693 11/13/2008 --

Signed and Sealed this
Twenty-sixth Day of April, 2016

Michelle K. Lee
*Director of the United States Patent and Trademark Office*